US009253092B2

(12) United States Patent
Gill et al.

(10) Patent No.: US 9,253,092 B2
(45) Date of Patent: Feb. 2, 2016

(54) PREDICTIVE QOS RESOURCE ALLOCATION FOR RAPID SESSION ESTABLISHMENT

(75) Inventors: Harleen K. Gill, San Diego, CA (US); Arulmozhi K. Ananthanarayanan, San Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 12/438,039

(22) PCT Filed: Sep. 28, 2007

(86) PCT No.: PCT/US2007/079999
§ 371 (c)(1),
(2), (4) Date: Feb. 19, 2009

(87) PCT Pub. No.: WO2008/040023
PCT Pub. Date: Apr. 3, 2008

(65) Prior Publication Data
US 2010/0172306 A1    Jul. 8, 2010

Related U.S. Application Data

(60) Provisional application No. 60/827,425, filed on Sep. 28, 2006.

(51) Int. Cl.
*H04L 12/28* (2006.01)
*H04L 12/801* (2013.01)
(Continued)

(52) U.S. Cl.
CPC ............... *H04L 47/10* (2013.01); *H04W 28/24* (2013.01); *H04W 4/10* (2013.01); *H04W 72/04* (2013.01); *H04W 76/005* (2013.01); *H04W 76/02* (2013.01)

(58) Field of Classification Search
CPC ..... H04W 76/005; H04W 4/10; H04W 28/24; H04W 28/26; H04W 76/02; H04W 4/22; H04L 67/322
USPC ................. 370/229–234, 310, 322, 328–330, 370/395.2, 395.21, 410, 449; 709/225, 226, 709/229; 455/426.1, 458, 515
See application file for complete search history.

(56) References Cited

U.S. PATENT DOCUMENTS 6,411,815 B1    6/2002    Balasuriya
7,418,004 B2    8/2008    Chou
(Continued)

FOREIGN PATENT DOCUMENTS

CN    1187998 A    7/1998
CN    1410905 A    4/2003
(Continued)

OTHER PUBLICATIONS

International Preliminary Report on Patentability, PCT/US2007/079999, International Bureau of WIPO, Apr. 9, 2009.
(Continued)

*Primary Examiner* — David Oveissi (57) ABSTRACT

Systems and methods for predictive QoS resource allocation in a wireless communication system are disclosed. An access network can detect a communication directed to an access terminal requiring QoS resources, send a page to an access terminal and allocate the QoS resources prior to receipt of the connection request from the access terminal.

39 Claims, 8 Drawing Sheets

(51) Int. Cl.
*H04W 28/24* (2009.01)
*H04W 4/10* (2009.01)
*H04W 72/04* (2009.01)
*H04W 76/00* (2009.01)
*H04W 76/02* (2009.01)

(56) References Cited

U.S. PATENT DOCUMENTS

| | | | |
|---|---|---|---|
| 7,688,811 B2 | 3/2010 | Kubler et al. | |
| 7,830,836 B2 | 11/2010 | Wan | |
| 2001/0036113 A1 | 11/2001 | Jurgensen et al. | |
| 2001/0038620 A1* | 11/2001 | Stanwood et al. | 370/449 |
| 2002/0123314 A1 | 9/2002 | Kitazawa et al. | |
| 2002/0126633 A1 | 9/2002 | Mizutani et al. | |
| 2002/0128017 A1* | 9/2002 | Virtanen | 455/452 |
| 2002/0165966 A1* | 11/2002 | Widegren et al. | 709/226 |
| 2003/0014509 A1 | 1/2003 | Jurado | |
| 2003/0103520 A1 | 6/2003 | Chen et al. | |
| 2003/0112766 A1* | 6/2003 | Riedel et al. | 370/328 |
| 2003/0227871 A1* | 12/2003 | Hsu et al. | 370/230 |
| 2004/0192363 A1 | 9/2004 | Rosetti et al. | |
| 2004/0203658 A1 | 10/2004 | Narayanan | |
| 2005/0043024 A1 | 2/2005 | Shiga | |
| 2005/0201324 A1* | 9/2005 | Zheng | 370/328 |
| 2005/0250523 A1* | 11/2005 | Lemke et al. | 455/515 |
| 2005/0288047 A1 | 12/2005 | Ananthanarayanan et al. | |
| 2006/0072526 A1 | 4/2006 | Rasanen | |
| 2006/0234716 A1* | 10/2006 | Vesterinen et al. | 455/450 |
| 2007/0058661 A1 | 3/2007 | Chow | |
| 2007/0121501 A1* | 5/2007 | Bryson | 370/230 |
| 2007/0123284 A1* | 5/2007 | Schliwa-Bertling et al. | 455/518 |
| 2009/0185527 A1* | 7/2009 | Akhtar et al. | 370/329 |
| 2010/0004012 A1 | 1/2010 | Ananthanarayanan et al. | |
| 2010/0027418 A1* | 2/2010 | Rodrig | 370/235 |
| 2010/0214996 A1 | 8/2010 | Santhanam et al. | |
| 2011/0211439 A1 | 9/2011 | Manpuria et al. | |
| 2011/0292798 A1 | 12/2011 | Manpuria | |

FOREIGN PATENT DOCUMENTS

| | | |
|---|---|---|
| CN | 1567782 A | 1/2005 |
| JP | 2001352573 A | 12/2001 |
| JP | 2002204481 A | 7/2002 |
| JP | 2002281564 A | 9/2002 |
| JP | 2003169363 A | 6/2003 |
| JP | 2004289841 A | 10/2004 |
| JP | 2004535729 | 11/2004 |
| JP | 2005057394 | 3/2005 |
| JP | 2005277911 A | 10/2005 |
| JP | 2006094179 A | 4/2006 |
| JP | 2006108790 A | 4/2006 |
| JP | 2008503989 A | 2/2008 |
| JP | 2008533836 A | 8/2008 |
| RU | 2006102360 | 8/2006 |
| WO | WO03007560 A1 | 1/2003 |
| WO | 2005086501 | 9/2005 |
| WO | 2005094096 | 10/2005 |
| WO | 2005115031 | 12/2005 |
| WO | WO2006002218 | 1/2006 |
| WO | 2006038083 | 4/2006 |
| WO | WO2006099062 A1 | 9/2006 |

OTHER PUBLICATIONS

International Search Report, PCT/US2007/079999, International Searching Authority, European Patent Office, Mar. 17, 2008.

Written Opinion, PCT/US2007/079999, International Searching Authority, European Patent Office, Mar. 17, 2008.

Fabrice Valois, et al., "QoS-Oriented Channel Assignment Strategy for Hierarchical Cellular Networks", pp. 1599-1603, IEEE, (2000).

S.Paskalis, et al.,"An Efficient RSVP-Mobile IP Interworking Scheme", pp. 197-207, Kluwer Academic Publishers, (2003).

Taiwan Search Report—TW096136448—TIPO—Sep. 16, 2011.

\* cited by examiner

PREDICTIVE QOS RESOURCE ALLOCATION FOR RAPID SESSION ESTABLISHMENT

The present application claims priority to PCT Patent Application No. PCT/US2007/079999 filed Sep. 28, 2007 which claims priority to provisional U.S. Application Ser. No. 60/827,425, entitled "PREDICTIVE QOS RESOURCE ALLOCATION FOR RAPID SESSION ESTABLISHMENT," filed Sep. 28, 2006, and assigned to the assignee hereof and hereby expressly incorporated by reference herein.

BACKGROUND OF THE INVENTION

1. Field of the Invention

The invention relates to communications in a wireless telecommunication system and, more particularly to session establishment for applications that have quality of service (QoS) requirements.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

As mobile communications have increased, Quality of Service (QoS) has become important to provide differentiation of traffic and increased service level capability. However, there are many different standards to describe Quality of Service requirements on different parts of the networks. For instance, a 1xEV-DO Rev. A network is configured for QoS as described in 3GPP2 X.S0011-004-C Version 2.0 cdma2000 Wireless IP Network Standard: Quality of Service and Header Reduction Specification. However, the same network describes configurations of QoS for data transmitted over the air interface between any AT and the AN in the 3GPP2 C.S0024-A Version 2.0 cdma2000 High Rate Packet Data Air Interface Specification. The same network also differentiates intra-AT and inter-AT QoS, since Intra-AT QoS provides differentiation of data streams belonging to the same user, while inter-AT QoS provides differentiation of packets belonging to different users. Therefore there is a need for an end-to-end QoS between the AT and AN for PTT communications.

SUMMARY OF THE INVENTION

Exemplary embodiments of the present invention are directed to a system and method for predictive QoS resource allocation in a wireless communication system.

Accordingly an embodiment of the invention can include a method for predictively allocating QoS resources comprising: detecting a communication request requiring QoS resources directed to an access terminal; and allocating the QoS resources prior to receiving a request from the access terminal to allocate the QoS resources.

Another embodiment of the invention can include an apparatus comprising: logic configured to detect a communication request requiring QoS resources directed to an access terminal; and logic configured to allocate the QoS resources prior to receiving a request from the access terminal to allocate the QoS resources.

Another embodiment of the invention can include a wireless communication system configured to predictively allocate QoS resources, the wireless communication system comprising: means for detecting a communication request requiring QoS resources directed to an access terminal; and means for allocating the QoS resources prior to receiving a request from the access terminal to allocate the QoS resources.

Another embodiment of the invention can include a computer-readable medium including code stored thereon for predictively allocating QoS resources comprising: code for causing a computer to detect a communication request requiring QoS resources directed to an access terminal; and code for causing a computer to allocate the QoS resources prior to receiving a request from the access terminal to allocate the QoS resources.

Another embodiment of the invention can include an access terminal comprising: logic configured to receive a page from an access network; logic configured to request a connection with the access network; logic configured to determine if QoS resources are needed for a requested communication; and logic configured to detect if an initial connection response from the access network has allocated the QoS resources.

Another embodiment of the invention can include a method for responding to predictively allocated QoS resources at an access terminal, the method comprising: receiving a page from an access network; requesting a connection with the access network; determining if QoS resources are needed for a requested communication; and detecting if an initial connection response from the access network has allocated the QoS resources.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
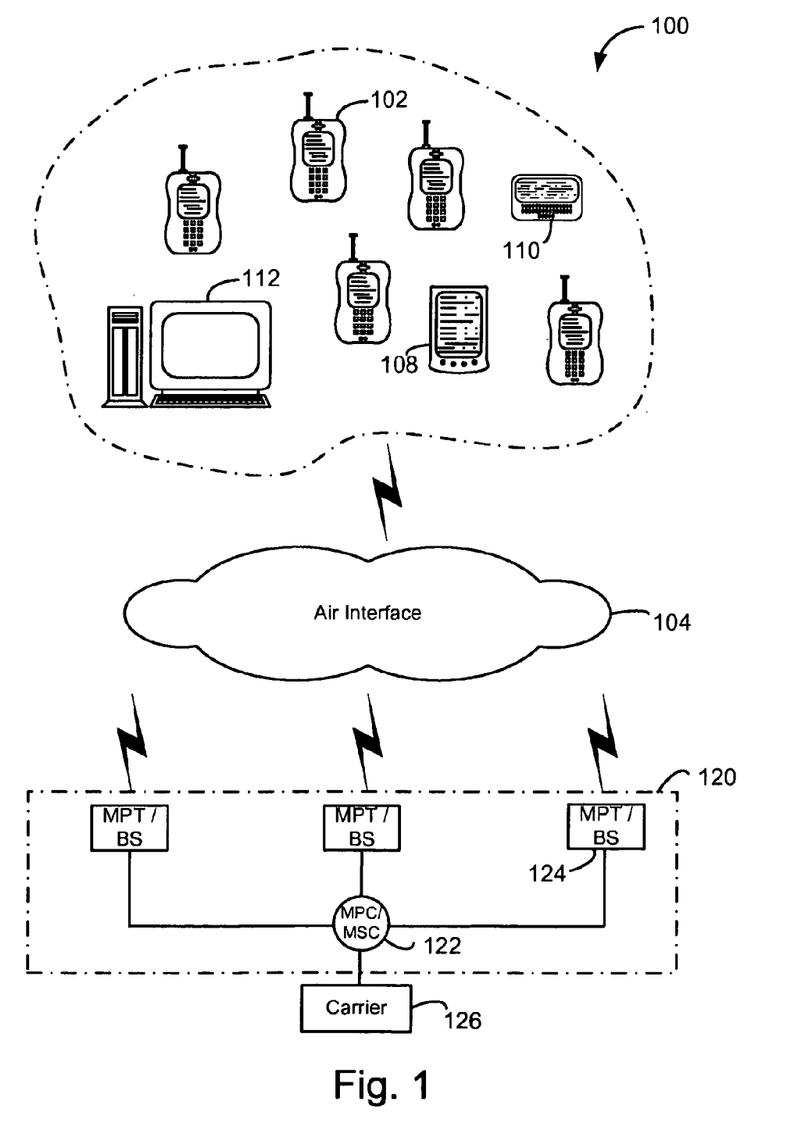
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
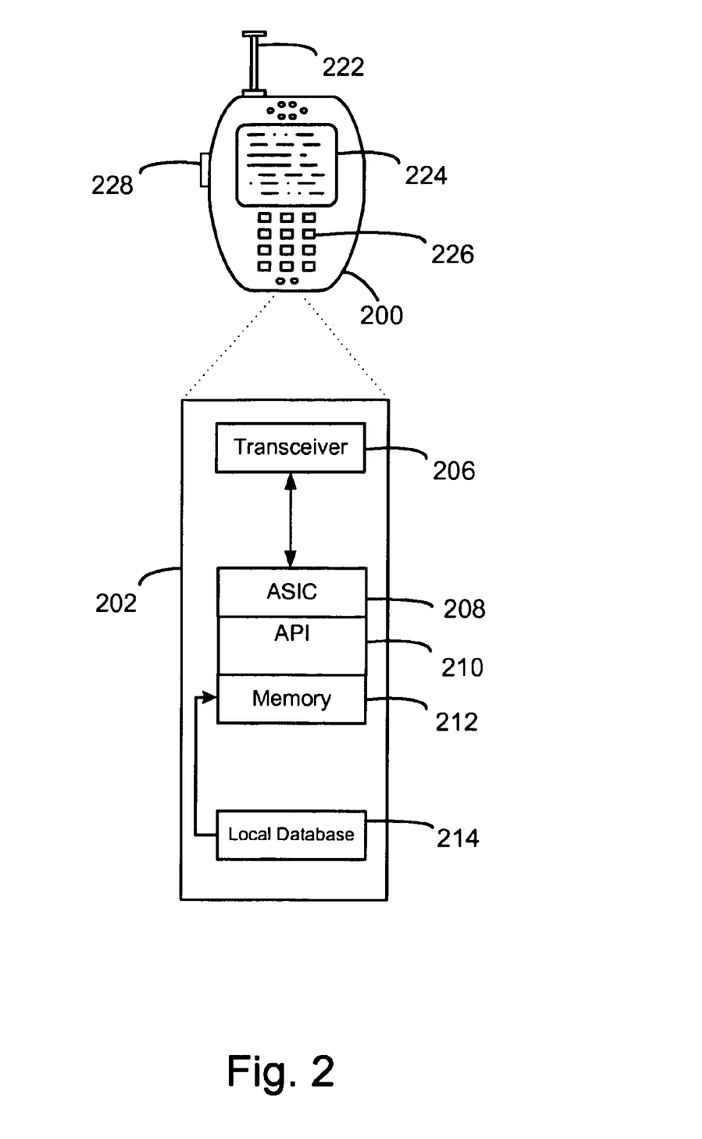
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the foregoing, QoS resources can be used for differentiation of traffic and increased service level capability. Data applications requiring QoS resources in order to provide service typically initiate such requests from the network. For example, an access terminal will conventionally receive a page and then open a traffic channel to receive the information related to the page. Upon receiving the information that the communication will require certain QoS resources (e.g., a push-to-talk (PTT) call/group call), the access terminal will then request these services from the RAN. Upon receiving confirmation that the QoS resources are allocated the application can then proceed with the communication. A detailed example will be discussed next for AT-terminated (e.g., forward link) communications.

Figure 8:
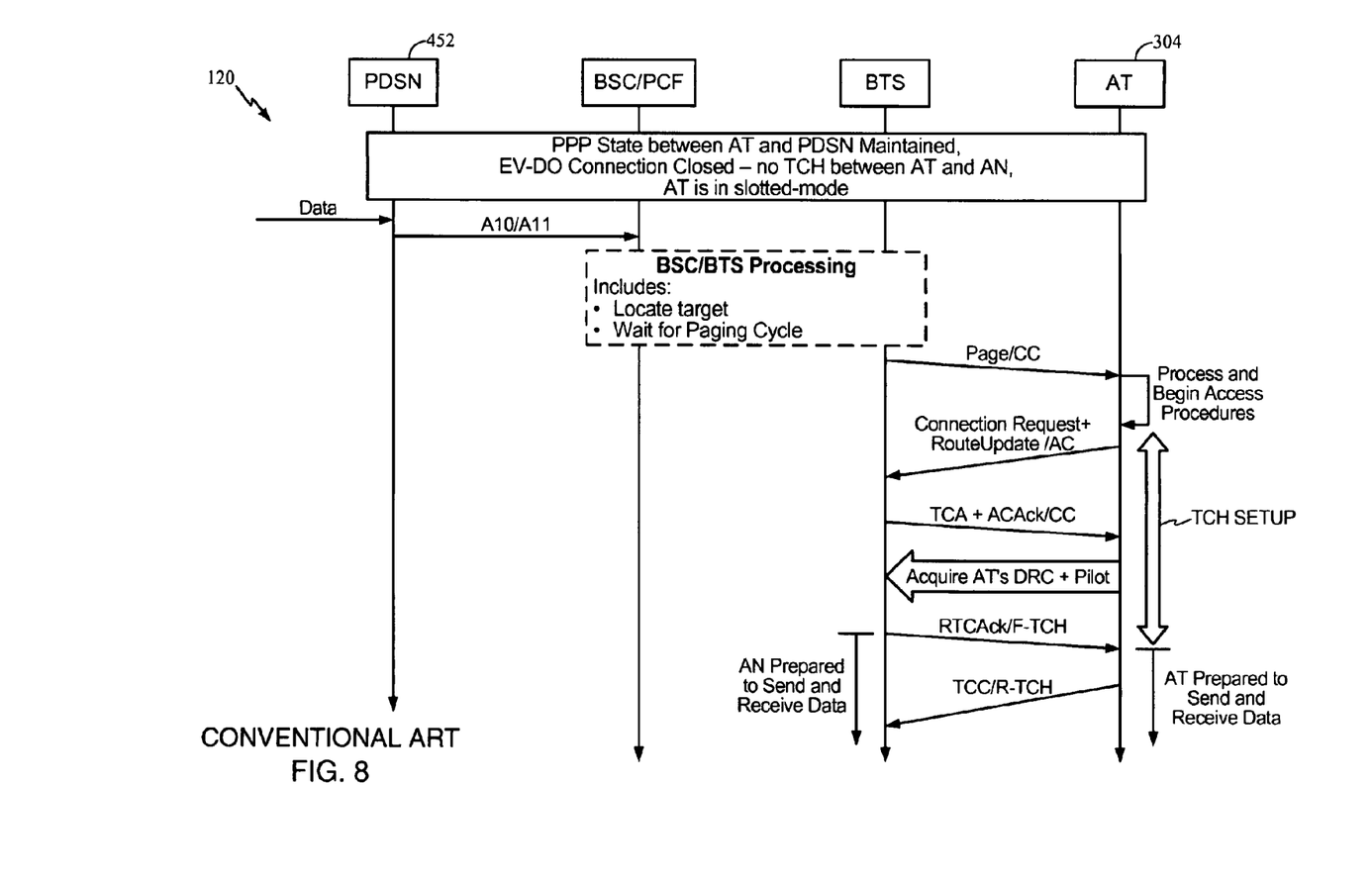
FIG. 8 is an illustration of a signal flow diagram in accordance with a conventional system.

AT-terminated communications to an AT in slotted-mode of operation can be delivered using the standard paging approach as described in 3GPP2 C.SO024-A. FIG. 8 illustrates details of this standard paging approach. FIG. 8 assumes that the AT is in slotted-mode and it does not have a traffic channel (i.e., has closed its 1xEV-DO Connection) but it still has a PPP state maintained at the PDSN. When data for the AT arrives at the network, it is routed via the A10/A11 interface from the PDSN to the PCF. Assuming a one-to-one association between the PCF and the BSC, data arrives across the A8/A9 interface at the BSC where the AT is expected to be located. The BSC prepares a page message and flood-pages the message to all BTS sectors in its authority. When the AT hears the page it responds by initiating a traffic channel setup request via a ConnectionRequest message. The remainder of the call flow is the signaling for traffic channel setup as defined by the 1xEV-DO standard. After the physical channel is established and the RTCAck is sent, the RAN sends the data to the AT over the traffic channel. However, embodiments of the invention are not limited to this implementation, as will be appreciated by those skilled in the art and it is merely provided as a detailed example to aid in the explanation of embodiments of the invention.

Embodiments of the invention provide methods and systems for the network to predictively allocate QoS resources when delivering network originated traffic to the access terminal/data application. The predictive allocation of QoS services can reduce or eliminate the delay incurred in conventional systems by having the access terminal/application request the service. Additional details regarding various aspects of embodiments of the invention follows, using a PTT/group communication system for illustrative purposes.

However, those skilled in the art will appreciate that the invention is not limited to these systems and may be used for any application using QoS resources.

Figure 3:
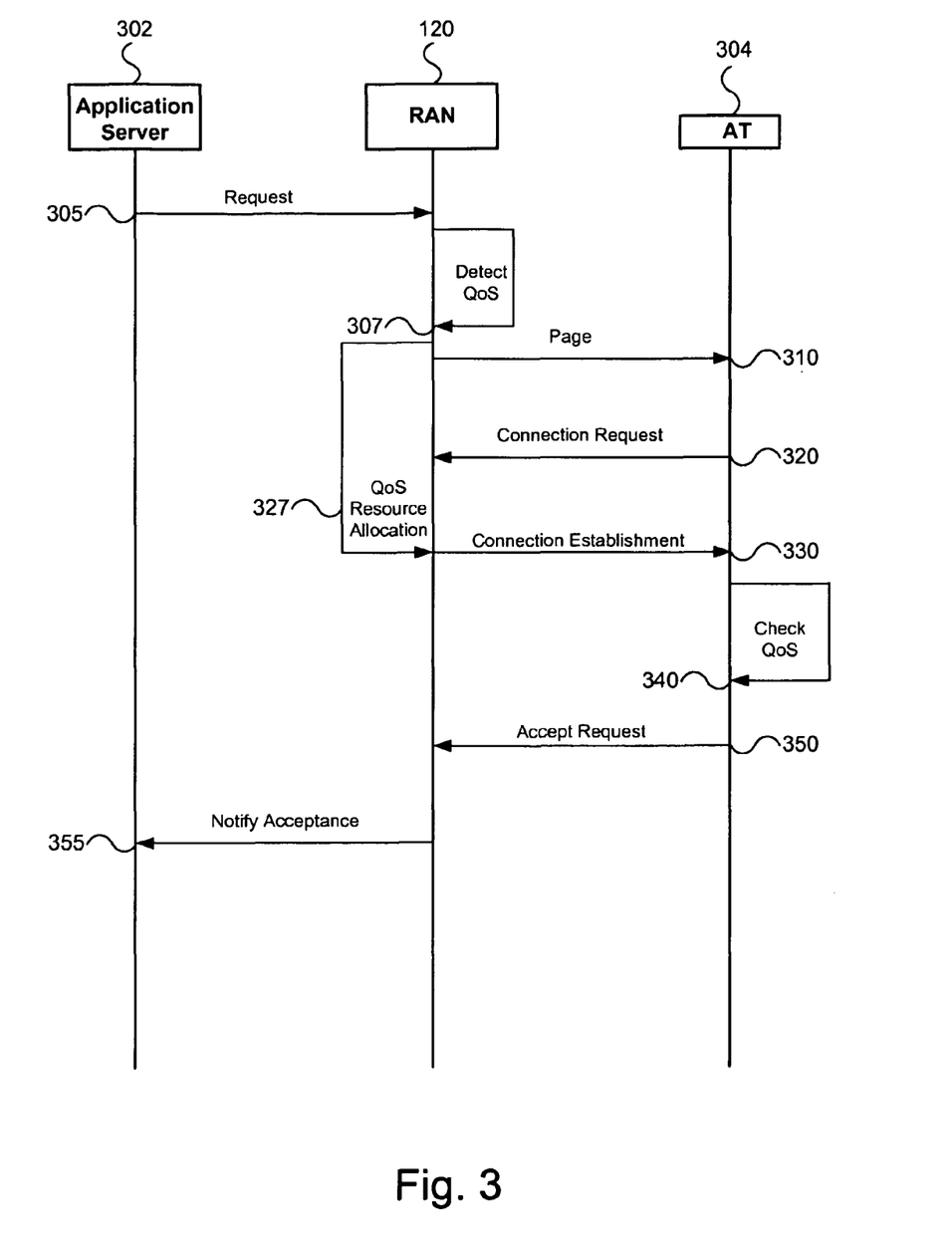
FIG. 3 is a signal flow diagram in accordance with at least one embodiment of the invention.

Referring to FIG. 3, a signal flow diagram illustrating aspects of embodiments of the invention is provided. An application server (e.g., a QChat® server) 302 can generate a request, 305, for communication with an access terminal, 304, requiring QoS resources. The application server 302 can mark the request 305 as requiring QoS resources, which can then be detected, 307, by the RAN 120. The RAN 120 can use this information to allocate the QoS resources, 327, prior to a request coming from the access terminal 304. The RAN 120 can then send out a page, 310, (typically over multiple sectors) to the access terminal 304. The access terminal 304 can then request a connection, 320. Upon receipt of the connection request the RAN 120, can determine what sector access terminal 304 is in. The RAN 120 can then allocate the QoS resources, 327, and establish a connection, 330, serving the access terminal 304. However, if the RAN 120 tracks the location of the access terminal 304 with sufficient granularity to determine the sector the access terminal 304 is located in, the RAN 120 can allocate the QoS resources even before the connection request 320. Upon receipt of the information regarding the requested communication, the access terminal 304 can recognize that QoS resources are needed for this communication and can check for the QoS resource allocation, 340, in the established connection. Since the QoS resources were already allocated at the RAN 120, the access terminal 304 can directly accept the request, 350. This avoids the additional delay of the access terminal having to request the QoS resources after the initial information is received regarding the requested communication. Once the access terminal 304 has accepted the requested communication (e.g., PTT/QChat® call), this can be forwarded to the application server (e.g., QChat® server), 355, and the communication can proceed.

Accordingly, an embodiment of the invention can include an apparatus (e.g., RAN, BSC, BTS) including logic configured to detect a communication requiring QoS resources, logic configured to page a targeted device (e.g., access terminal) and logic configured to allocate the QoS resources prior to establishing a connection with the targeted device.

As noted above, embodiments of the invention can reduce process delays in delay sensitive applications. A group communication (PTT/QChat®) system is an example of a delay sensitive system that can take advantage of reduced connection times offered by the predictive QoS allocation disclosed herein. The group communication system may also be known as a push-to-talk (PTT) system, a QChat® system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communication system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as access terminals (ATs) 102, 108, and 304. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each AT may be able to send and receive information in either a secure mode, or a non-secure (clear) mode. It should be understood that reference to an AT is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example, the request may be transmitted over the air to one from AT 102 or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to the RAN 120.

Figure 4:
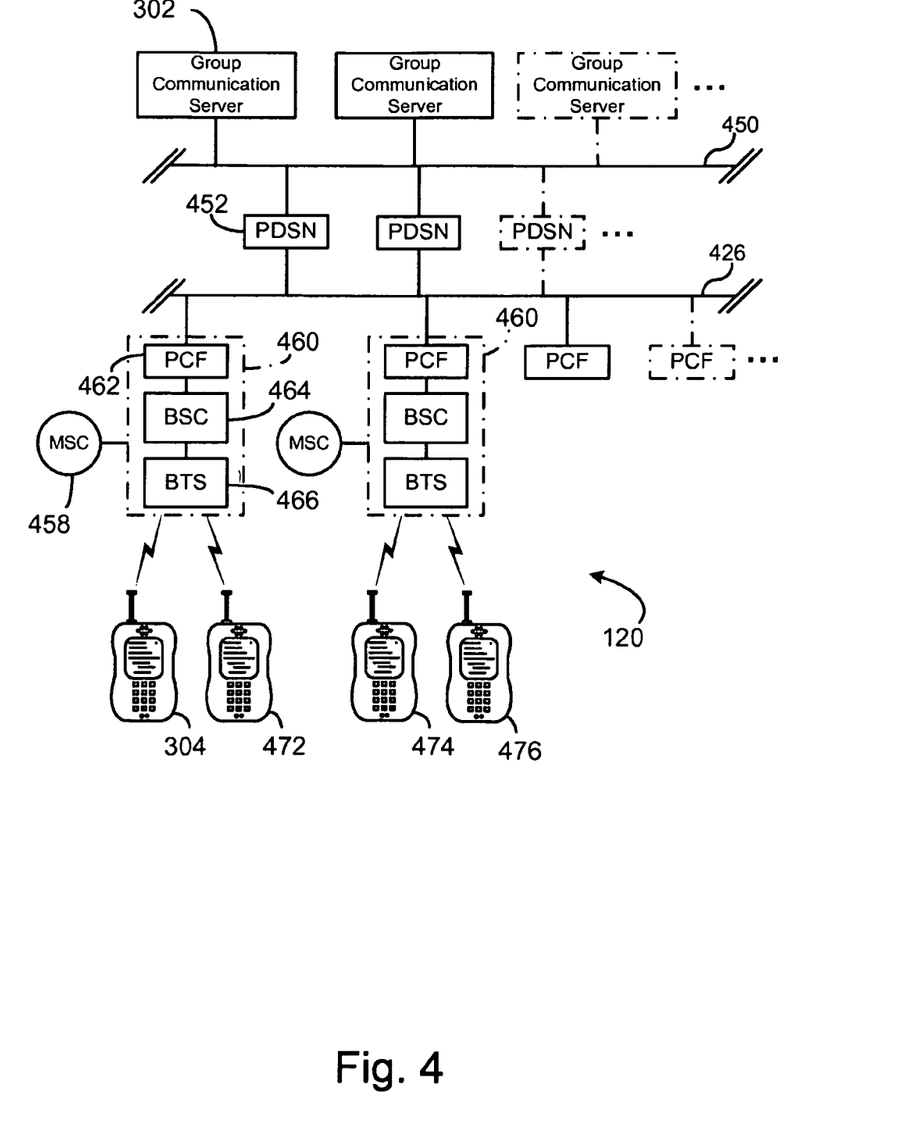
FIG. 4 is an illustration of a group communication system in accordance with at least one embodiment of the invention.

Referring to FIG. 4, one or more group communication (e.g., QChat®) servers 302 can monitor traffic of the group communication system through its connection to distributed network. Since the group communication server 302 can be connected to the distributed network through a variety of wired and wireless interfaces, geographic proximity to group participants is not necessary. Typically, a group communication server 302 controls communications between the wireless devices of set group members (ATs 304, 472, 474, 476) in a PTT system. The wireless network illustrated is merely exemplary and can include any system whereby remote modules communicate over-the-air between and among each other and/or between and among components of a wireless network including, without limitation, wireless network carriers and/or servers. Further, a series of group communication servers 302 can be connected to a group communication server LAN 450.

The group communication server(s) 302 can be connected to a wireless service provider's packet data service node (PDSN) such as PSDN 452, shown here resident on a carrier network 426. Each PSDN 452 can interface with a base station controller 464 of a base station 460 through a packet control function (PCF) 462. The PCF 462 may be located in the base station 460. The carrier network 426 controls messages (generally in the form of data packets) sent to a MSC 458. The MSC 458 can be connected to one or more base stations 460. In a similar manner to the carrier network, the MSC 458 is typically connected to the BTS 466 by both the network and/or Internet for data transfer and PSTN for voice information. The BTS 466 ultimately broadcasts and receives messages wirelessly to and from the wireless ATs, such as cellular telephones 304, 472, 474, 476, as is well known in the art. Accordingly, the general details of a group communication system will not be further discussed. However, the following description will discuss specific aspects of specific systems (e.g., QChat®, 1xEV-DO) to provide additional details regarding embodiments of the invention.

In embodiments of the invention the server (e.g., QChat® server), 302 can set Differentiated Services Code Point (DSCP) values to identify data packets in the network for which QoS can be granted predictively. Further, 1xEV-DO Profile ID mappings to QoS reservations flows can be used to identify data streams at the network for which QoS can be granted predictively. The system can use DSCP to distinguish QChat® traffic from all other data traffic on the network. The AT-terminated QChat® data may be marked with QChat® DSCP values in the Type of Service (TOS) field (or DS field) of the IP datagram. These DSCP values identify IP network QoS requirements and different data delivery mechanisms for the AT-terminated QChat® packet traffic. The Differentiated Services framework can be used to provide service discrimination for IP packets without the need to maintain per-flow state and signaling at each hop. Routers can examine the DSCP values on ingress IP packets and provide appropriate per-hop behavior to each flow. Typically, this information would not be modified by any network components between the application server 302 and PDSN 452.

As discussed above, the AT 304 is paged to bring up its traffic channel in order to establish a communication (e.g., a QChat® call). The QChat® call is accepted by the target AT 304 if both, traffic channel and QoS resources for QChat® In-Call Signaling and Media are available (additional details regarding the QoS resources are provided below and in FIG. 5). Since the AT 304 does not know at the time of the receipt of the page, that it is being paged for a QChat® call, it cannot issue a QoS request for in-call QChat® flows when it sends its connection request message. In the conventional systems, the AT 304 would have to wait to receive QChat® signaling packets in order to determine that it requires QoS resources for a QChat® call. However, to reduce this delay in accordance with embodiments of the invention, the RAN 120 performs predictive QoS allocation for a QChat® call as discussed in the foregoing. Accordingly, when a connection request is received from the QChat® AT 304 that is paged in response to QChat® DSCP marked data, the RAN (e.g., BSC 464/BTS 466) determines that it needs to allocate QoS resources (e.g., QChat® In-Call Signaling and Media) without an explicit AT request. Further, the RAN 120 signals to the AT 304 that the QoS resources are available.

Figure 7:
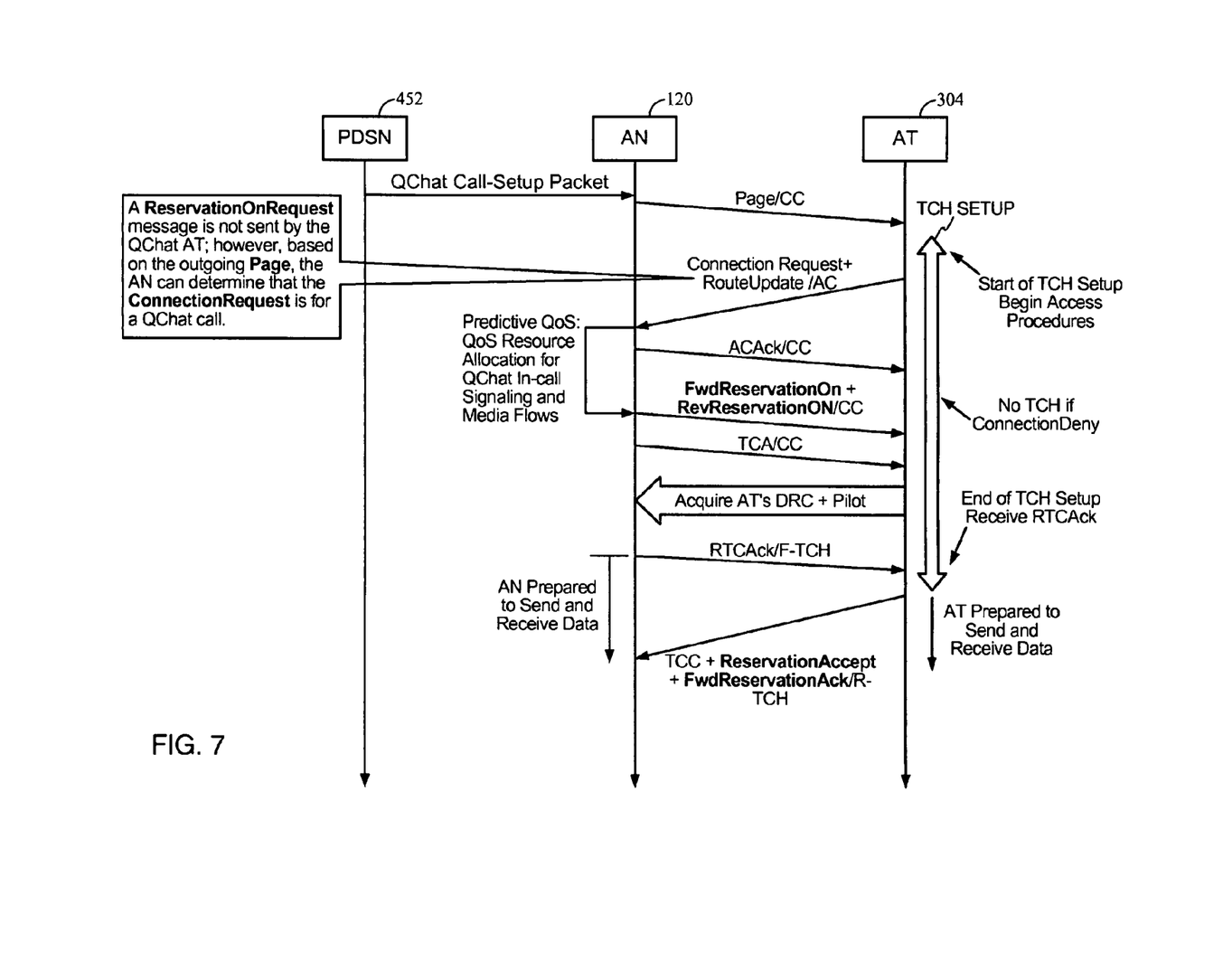
FIG. 7 is an illustration of a signal flow diagram in accordance with at least one embodiment of the invention.

As will be appreciated by those skilled in the art the QoS resources needed may vary for different applications or within applications. The following examples describe QoS design under different QoS resource scenarios:

When traffic channel resources and QoS resources for QChat® In-Call Signaling and Media reservations are available in the target AT's sector, the RAN signals that QoS resources are available for both the forward and reverse links by transmitting FwdReservationOn and RevReservationOn messages for the In-Call Signaling and Media reservations. This call flow is illustrated in FIG. 7. The FwdReservationOn and RevReservationOn messages are scheduled ahead of the QChat® Call-Setup message so that the target AT is aware that it has the necessary QoS resources at the time of reception of the QChat® Call-Setup packet and can accept the QChat® call without any further delay. It is noted that if some of the In-Call Signaling and Media reservations are already allocated to the target AT at the time of arrival of a QChat® Call Setup packet, the RAN will only activate the In-Call Signaling and Media reservations that are not allocated at that moment using the FwdReservationOn and RevReservationOn messages.

When traffic channel resources are available in the sector where the target AT is located, but QoS resources for some or all of the QChat® reservations are not available, the RAN can still allocate the traffic channel and transmits the TCA message to the target AT. Establishing the traffic channel enables the AT to complete QChat® Call-Setup Signaling over the traffic channel even when QoS resources for the QChat® In-Call Signaling and Media reservations are not available.

When no traffic channel resources are available in the target AT sector, the RAN denies the traffic channel request by transmitting the ConnectionDeny message as per the 1xEV-DO Revision A standard.

For AT-terminated QChat® calls, where the target of the call is paged following the arrival of a QChat® Call-Setup packet, the RAN can indicate that QoS resources for both In-Call Signaling and Media reservations have been granted by transmitting the FwdReservationOn and RevReservationOn message for the QChat® In-Call Signaling and Media reservations during traffic channel setup.

For AT-terminated QChat® calls, where the target of the call is paged following the arrival of a QChat® Call-Setup packet, the RAN can schedule the FwdReservationOn and RevReservationOn message for the QChat® In-Call Signaling and Media reservations prior to the QChat® Call-Setup message if both traffic channel and QoS resources for QChat® reservations are available.

If some of the In-Call Signaling and Media reservations are already allocated to the target AT at the time of arrival of a QChat® Call Setup packet, the RAN may only activate the In-Call Signaling and Media reservations that are not allocated at that moment using the FwdReservationOn and RevReservationOn messages.

For AT-terminated QChat® calls, where the target of the call is paged following the arrival of a QChat® Call-Setup packet, the RAN will establish a traffic channel, if traffic channel resources are available independent of QoS resources being available for QChat® In-Call and Media reservations.

1xEV-DO Revision A is designed to provide efficient access to packet data networks and is widely based on the Internet for its network architecture. Data traffic traversing Internet Protocol (IP) network elements at the PDSN 452, PCF 462, and RAN 120 can be based on standard Internet Engineering Task Force (IETF)-based protocols that support methods for differentiating traffic based on QoS requirements. QoS between the AT 304 and the 1xEV-DO Revision A network is configured as described in the 3GPP2 X.S0011-004-C Version 2.0 cdma2000 Wireless IP Network Standard: Quality of Service and Header Reduction specification, the contents of which are incorporated herein by reference. Data traffic transmitted over the air interface between the AT 304 and the RAN 120 can be configured for appropriate QoS treatment via 1xEV-DO Revision A protocols as described in the 3GPP2 C.S0024-A Version 2.0 cdma2000 High Rate Packet Data Air Interface Specification, the contents of which are incorporated herein by reference. 1xEV-DO Revision A provides standard mechanisms to offer intra-AT and inter-AT QoS. Intra-AT QoS provides differentiation of data streams belonging to the same user, while inter-AT QoS provides differentiation of packets belonging to different users.

To achieve QoS, traffic differentiation should be available end-to-end. All network components including the AT 304, RAN 120 (BTS 466, BSC 464), PDSN 452, and Internet routers should implement/support QoS. End-to-end QoS in 1xEV-DO Revision A network can be achieved through the following mechanisms:

Packet Fitters: Packet filters at the PDSN map forward traffic flows to the AT and define the QoS treatment that should be applied to forward data traffic. The AT signals QoS requests that establish packet filters at that PDSN as described in the 3GPP2 X.S0011-004-C Version 2.0 cdma2000 Wireless IP Network Standard: Quality of Service and Header Reduction specification.

QoS Profiles (Profile IDs): QoS Profiles and/or Profile IDs are a mechanism to specify (or predefine) relevant air interface parameters and network QoS requirements for a data service. It is a 'shorthand' identifier that the AT uses when requesting a QoS reservation for a flow with the RAN. Standard Profile ID assignments available for various data services are described in TSB58-G Administration of Parameter Value Assignments for cdma2000 Spread Spectrum Standards, the contents of which are incorporated herein by reference.

Reverse Traffic Marking: The AT can mark reverse traffic data in accordance with the Differentiated Services (DiffServ) framework and standards. These markings define the QoS network treatment requested for data outbound at the PDSN.

QoS in a 1xEV-DO Revision A network is also based on the proper mapping or binding of the following elements for the AT's PPP session, such as follows:

IP (Application) Flow: Application layer QoS requirements at the AT and PDSN are defined by identifying unique IP flows. A reservation label is associated with the IP flow to identify the QoS requirements for the flow between the AT and the RAN. An IP flow is then mapped onto an RLP flow that best satisfies the QoS requirements.

RLP (Link) Flow: Radio Link Protocol (RLP) flows are allocated based on QoS requirements (e.g., RLP parameter configuration) for upper layer flows. IP flows with the same QoS requirements can be mapped onto the same RLP flow. In the reverse direction, an RLP flow is mapped onto a RTCMAC flow.

RTCMAC flow: RTCMAC flows are allocated based on QoS requirements that define physical layer latency and/or capacity needs for an upper layer flow. For example, flows can be low-latency or high capacity flows. RLP flows with the same QoS requirements can be mapped to the same RTCMAC flow.

Figure 5:
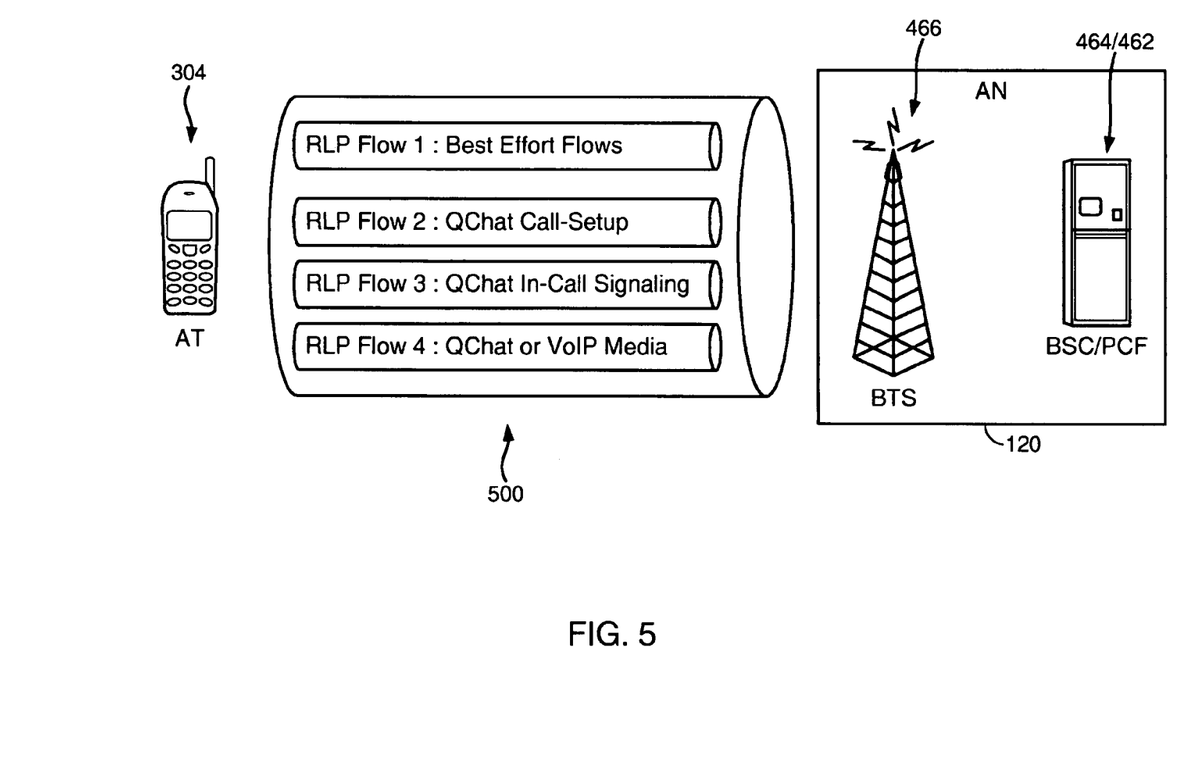
FIG. 5 is an illustration of RLP Flows for an application in accordance with at least one embodiment of the invention.

As noted above different applications can have different QoS requirements. For example, QChat® over 1xEV-DO Revision A receives high priority and low latency data delivery through the specification of network QoS requirements. QChat® uses the allocation of three (3) IP flows at the AT:

1. A flow for Call-Setup Signaling
2. A flow for In-Call Signaling
3. A flow for Media Each QChat® IP flow has specific QoS requirements and is mapped onto three separate RLP flows. QChat®-enabled ATs can have up to four active RLP flows when active in a QChat® call; three flows for QChat® and one for the default Best Effort (BE) flow. QoS requirements for QChat® media can be considered to be similar to VoIP media and therefore this RLP flow can be shared with VoIP. FIG. 5 illustrates the multiple RLP flows 500 for a QChat®-enabled AT 304 in communication with access network 120. The QoS requirements for each flow can be specified via QoS profiles.

Although the foregoing description provides many details specific to QChat® and the 1xEV-DO network to provide a detailed illustration of various aspects of embodiments of the invention, those skilled in the art will appreciate that embodiments of the invention are not limited to any specific application and/or network. Embodiments of the invention can include any application that has QoS requirements. Further, any network that can support the allocation of QoS resources can also be included in embodiments of the invention.

Figure 6:
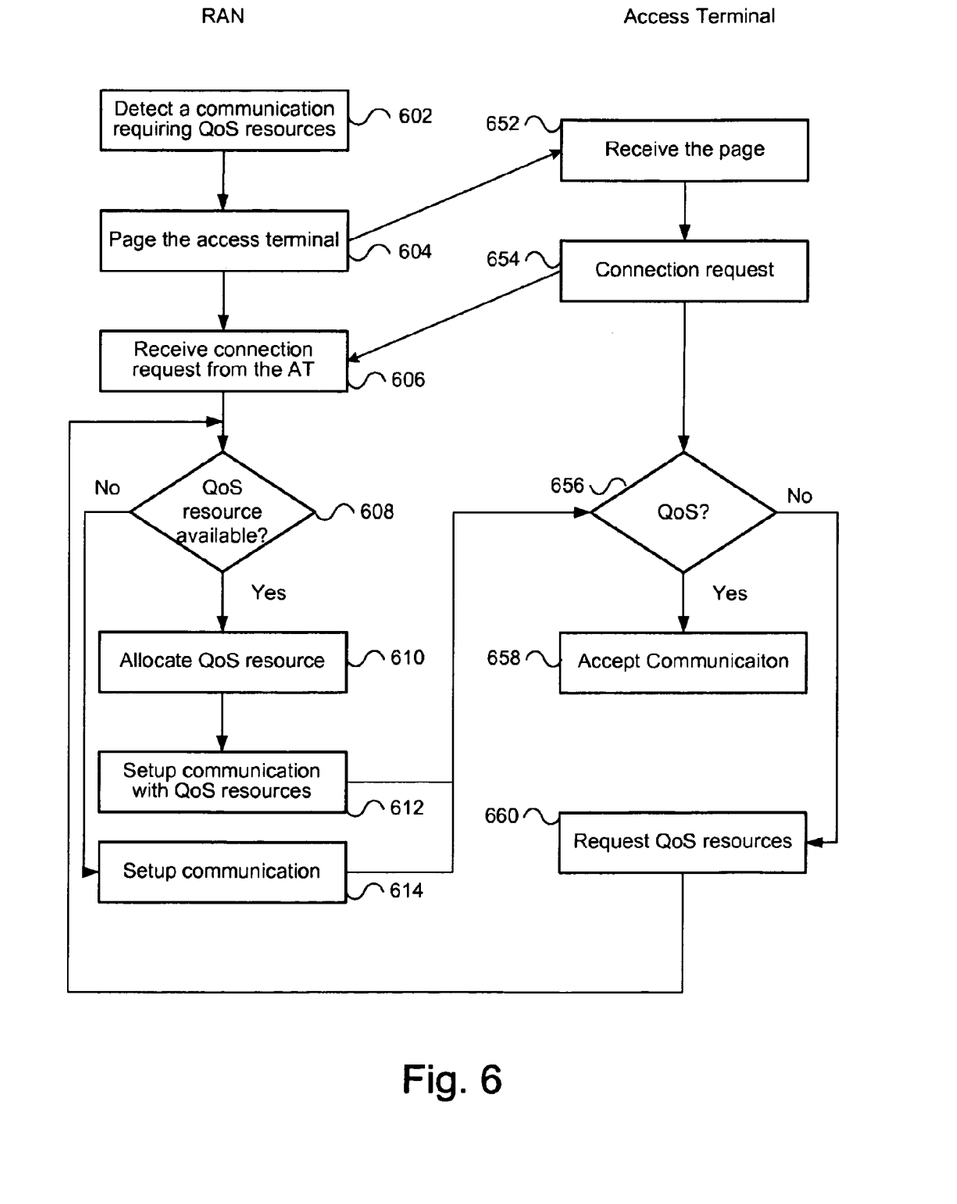
FIG. 6 is an illustration of method in accordance with at least one embodiment of the invention.

In view of the foregoing disclosure, those skilled in the art will recognize that embodiments of the invention include methods of performing the sequence of actions, operations and/or functions previously discussed. Referring to FIG. 6, a flowchart illustrating at least one method according to embodiments of the invention is provided. For example, the method can include detecting a communication request directed to an access terminal requiring QoS resources, 602. A page can be sent to the access terminal, 604. The QoS resources can be allocated, 610, and the communication can be established having the QoS resources allocated, 612, before a specific request for QoS resource allocation is made from the access terminal. As illustrated in FIG. 6, the QoS resources allocation may be performed after the connection request 654 is received in the case where the RAN can not determine the sector serving the access terminal prior to receipt of the connection request. However, as discussed above in relation to FIG. 3, the QoS resource allocation can occur prior to the receipt of the connection request when the RAN can determine the sector serving the access terminal, before receiving the connection request from the access terminal.

However, if the resources are not available, 608, the method can still proceed to set up a communication with the access terminal, 614. This will allow the access terminal to attempt to request the QoS resources. For example, the access terminal receives the page, 652, and sends a connection request, 654 in a conventional manner. When the access terminal receives the initial communication, it can determine if QoS resources are needed for the communication requested and if they are allocated, 656. If the QoS resources were predictively allocated in 612, then the communication request can be accepted, 658. However, if the QoS resources are needed for the requested communication and were not allocated (e.g., 614), then the access terminal can request the QoS resources from the RAN, 660. Those skilled in the art will appreciate that the illustrated flowchart and description intentionally does not detail every option or low level signaling so as not to distract from the features being discussed. For example, the case where the RAN denies the connection request is not illustrated, as it would result in no connection and is well known and would only distract from the description of embodiments of the invention.

A more detailed illustration of the signaling is provided in FIG. 7, which illustrates specific aspects of at least one embodiment of the invention. FIG. 7 illustrates an access terminated QChat® call with predictive QoS allocation, such as previously described. For example, details on the signaling between the access network 120 and AT 304 during the traffic channel setup at the AT 304 are included in this figure. These details are commented on in the figure and an additional restatement herein is not provided. Further, these details, while illustrating implementation details according to at least one embodiment of the invention, should not be construed as limiting all embodiments of the invention to the aspects illustrated.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly an embodiment of the invention can include an apparatus including logic configured to detect a communication request requiring QoS resources directed to an access terminal and logic configured to allocate the QoS resources prior to receiving a request from the access terminal to allocate the QoS resources. The apparatus can further include logic configured to page the access terminal, logic configured to receive a connection request from the access terminal, and logic configured to establish a connection with the access terminal with the allocated QoS resources. The various logical elements can be integrated into one device or can be distributed over several devices each operably couple to one another. For example, the apparatus can be a radio access network, a group communication system, or a wireless communication network.

Further, aspects of embodiments of the invention can include logical implementations of the functions described herein. For example, embodiments of the invention can further include logic configured to detect QoS resources currently allocated to the access terminal; and logic configured to allocate additional QoS resources needed for the requested communication. Accordingly, those skilled in the art will appreciate that embodiments of the invention are not limited to the examples provided herein.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for predictively allocating QoS resources comprising: code for causing a computer to detect a communication request requiring QoS resources directed to an access terminal, and code for causing a computer to allocate the QoS resources prior to receiving a request from the access terminal to allocate the QoS resources. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for allocating quality of service (QoS) resources comprising:
    detecting, by a radio access network, a communication request for a communication requiring QoS resources directed to an access terminal; and
    allocating, by the radio access network, the QoS resources prior to receiving a request from the access terminal to allocate the QoS resources, based on the detecting.

2. The method of claim 1, further comprising:
   paging the access terminal in response to detecting the communication request;
   receiving a connection request from the access terminal based on the paging; and
   establishing a connection with the access terminal with the allocated QoS resources.

3. The method of claim 2, wherein the QoS resources are allocated prior to the connection request.

4. The method of claim 2, wherein the access terminal checks for the allocated QoS resources in the established connection.

5. The method of claim 4, wherein the access terminal directly accepts the communication request without requesting additional QoS resources.

6. The method of claim 1, wherein the communication request is for a push-to-talk call.

7. The method of claim 1, wherein Differentiated Services Code Point (DSCP) values are used to detect the communication for the communication request requiring QoS services.

8. The method of claim 1, further comprising:
   detecting QoS resources currently allocated to the access terminal; and
   allocating additional QoS resources needed for the communication request.

9. The method of claim 1, wherein the QoS resources are allocated for In-Call Signaling and Media reservations.

10. The method of claim 1, further comprising:
    determining that insufficient QoS resources are available;
    paging the access terminal;
    receiving a connection request from the access terminal; and
    establishing a connection with the access terminal without the allocated QoS resources.

11. An apparatus comprising:
    a logic circuit configured to detect, by a radio access network, a communication request for a communication requiring quality of service (QoS) resources directed to an access terminal; and
    a logic circuit configured to allocate, by the radio access network, the QoS resources prior to reception of a request from the access terminal to allocate the QoS resources, based on detection of the communication request.

12. The apparatus of claim 11, further comprising:
    a logic circuit configured to page the access terminal in response to detection of the communication request;
    a logic circuit configured to receive a connection request from the access terminal based on the page; and
    a logic circuit configured to establish a connection with the access terminal with the allocated QoS resources.

13. The apparatus of claim 12, wherein the QoS resources are allocated prior to the connection request.

14. The apparatus of claim 12, wherein the access terminal checks for the allocated QoS resources in the established connection.

15. The apparatus of claim 14, wherein the access terminal directly accepts the communication request without requesting additional QoS resources.

16. The apparatus of claim 11, wherein the communication request is for a push-to-talk call.

17. The apparatus of claim 11, wherein Differentiated Services Code Point (DSCP) values are used to detect the communication request for the communication requiring QoS services.

18. The apparatus of claim 11, further comprising:
    a logic circuit configured to detect QoS resources currently allocated to the access terminal; and
    a logic circuit configured to allocate additional QoS resources needed for the communication request.

19. The apparatus of claim 11, wherein the QoS resources are allocated for In-Call Signaling and Media reservations.

20. The apparatus of claim 11, further comprising:
    a logic circuit configured to determine that insufficient QoS resources are available;
    a logic circuit configured to page the access terminal;
    a logic circuit configured to receive a connection request from the access terminal; and
    a logic circuit configured to establish a connection with the access terminal without the allocated QoS resources.

21. The apparatus of claim 11, wherein the apparatus is at least one of a radio access network, a group communication system, or a wireless communication network.

22. A wireless communication system configured to allocate quality of service (QoS) resources, the wireless communication system comprising:
    means for detecting, by a radio access network, a communication request for a communication requiring QoS resources directed to an access terminal; and
    means for allocating, by the radio access network, the QoS resources prior to reception of a request from the access terminal to allocate the QoS resources, based on detection of the communication request.

23. The wireless communication system of claim 22, further comprising:
    means for paging the access terminal in response to detection of the communication request;
    means for receiving a connection request from the access terminal based on the page; and
    means for establishing a connection with the access terminal with the allocated QoS resources.

24. The wireless communication system of claim 22, wherein Differentiated Services Code Point (DSCP) values are used to detect the communication request for the communication requiring QoS services.

25. The wireless communication system of claim 22, further comprising:
    means for detecting QoS resources currently allocated to the access terminal; and
    means for allocating additional QoS resources needed for the communication request.

26. The wireless communication system of claim 22, further comprising:
    means for determining that insufficient QoS resources are available;
    means for paging the access terminal;
    means for receiving a connection request from the access terminal; and
    means for establishing a connection with the access terminal without the allocated QoS resources.

27. A non-transitory computer-readable medium including code stored thereon for allocating quality of service (QoS) resources comprising:
    code for causing a radio access network to detect a communication request for the communication requiring QoS resources directed to an access terminal; and
    code for causing the radio access network to allocate the QoS resources prior to reception of a request from the access terminal to allocate the QoS resources, based on detection of the communication request.

28. The non-transitory computer-readable medium of claim 27, further comprising:

code for causing a computer to page the access terminal in response to detection of the communication request;
code for causing a computer to receive a connection request from the access terminal based on the page; and
code for causing a computer to establish a connection with the access terminal with the allocated QoS resources.

29. The non-transitory computer-readable medium of claim 27, further comprising:
code for causing a computer to detect QoS resources currently allocated to the access terminal; and
code for causing a computer to allocate additional QoS resources needed for the communication request.

30. An access terminal comprising:
a logic circuit configured to receive a page from an access network;
a logic circuit configured to request a connection with the access network;
a logic circuit configured to determine that quality of service (QoS) resources are needed for a requested communication; and
a logic circuit configured to detect that an initial connection response from the access network has allocated the QoS resources, wherein the QoS resources are allocated by the access network prior to a request from the access terminal to allocate the QoS resources, based on detection by the access network of the requested communication.

31. The access terminal of claim 30, comprising:
a logic circuit configured to accept the communication, based on the QoS resources being allocated; and
a logic circuit configured to request the QoS resources needed, based on the QoS resources not being allocated by the access network in the initial connection response.

32. A method for responding to allocated quality of service (QoS) resources at an access terminal, the method comprising:
receiving a page from an access network;
requesting a connection with the access network;
determining that QoS resources are needed for a requested communication; and
detecting that an initial connection response from the access network has allocated the QoS resources, wherein the QoS resources are allocated by the access network prior to a request from the access terminal to allocate the QoS resources, based on detection by the access network of the requested communication.

33. The method of claim 32, comprising:
accepting the communication, based on the QoS resources being allocated; and
requesting the QoS resources needed for the communication, based on the QoS resources not being allocated by the access network in the initial connection response.

34. An access terminal configured to respond to allocated quality of service (QoS) resources, the access terminal comprising:
means for receiving a page from an access network;
means for requesting a connection with the access network;
means for determining that QoS resources are needed for a requested communication; and
means for detecting that an initial connection response from the access network has allocated the QoS resources, wherein the QoS resources are allocated by the access network prior to a request from the access terminal to allocate the QoS resources, based on detection by the access network of the requested communication.

35. The access terminal of claim 34, further comprising:
means for accepting the communication, based on the QoS resources being allocated; and
means for requesting the QoS resources needed for the communication, based on the QoS resources not being allocated by the access network in the initial connection response.

36. A non-transitory computer-readable medium including code stored thereon for responding to allocated quality of service (QoS) resources, comprising:
code for causing a computer to receive a page from an access network;
code for causing a computer to request a connection with the access network;
code for causing a computer to determine that QoS resources are needed for a requested communication; and
code for causing a computer to detect that an initial connection response from the access network has allocated the QoS resources, wherein the QoS resources are allocated by the access network prior to a request from the access terminal to allocate the QoS resources, based on detection by the access network of the requested communication.

37. The non-transitory computer-readable medium of claim 36, further comprising:
code for causing a computer to accept the communication, based on the QoS resources being allocated; and;
code for causing a computer to request the QoS resources needed for the communication, based on the QoS resources not being allocated by the access network in the initial connection response.

38. The method of claim 1, wherein a connection request is received from the access terminal before a request from the access terminal to allocate the QoS resources.

39. The method of claim 32, wherein the access terminal transmits the connection request before transmitting a request to allocate the QoS resources.

* * * * *